US012744207B2

(12) United States Patent
Liu et al.

(10) Patent No.: US 12,744,207 B2
(45) Date of Patent: Sep. 22, 2026

(54) ALL-SOLID-STATE LITHIUM BATTERY AND MANUFACTURING METHOD THEREOF

(71) Applicant: CPC CORPORATION, TAIWAN, Kaohsiung (TW)

(72) Inventors: Shih-An Liu, Kaohsiung (TW); Yu-Kai Liao, Kaohsiung (TW); Shu-Fen Hu, Kaohsiung (TW); Kevin Iputera, Kaohsiung (TW); Ru-Shi Liu, Kaohsiung (TW); Jui-Hsiung Huang, Kaohsiung (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 501 days.

(21) Appl. No.: 18/368,923

(22) Filed: Sep. 15, 2023

(65) Prior Publication Data

US 2025/0015278 A1 Jan. 9, 2025

(30) Foreign Application Priority Data

Jul. 6, 2023 (TW) ................................ 112125178

(51) Int. Cl.

*H01M 4/40* (2006.01)
*C01G 15/00* (2006.01)
*C01G 25/00* (2006.01)
*H01M 4/02* (2006.01)
*H01M 4/58* (2010.01)
*H01M 10/052* (2010.01)
*H01M 10/0562* (2010.01)

(52) U.S. Cl.

CPC .......... *H01M 4/405* (2013.01); *C01G 15/006* (2013.01); *C01G 25/006* (2013.01); *H01M 4/5825* (2013.01); *H01M 10/052* (2013.01); *H01M 10/0562* (2013.01); *C01P 2006/40* (2013.01); *H01M 2004/027* (2013.01); *H01M 2004/028* (2013.01); *H01M 2300/0071* (2013.01)

(58) Field of Classification Search

CPC .... H01M 4/405; H01M 4/5825; H01M 4/382; H01M 4/134; H01M 4/1395; H01M 10/052; H01M 10/0562; H01M 2004/027; H01M 2004/028; H01M 2300/0071; H01M 2300/0068; H01M 2300/0074; H01M 2300/0077

See application file for complete search history.

(56) References Cited

U.S. PATENT DOCUMENTS

2009/0186277 A1* 7/2009 Beck .................. H01M 10/052 429/231.95
2023/0146632 A1* 5/2023 Kim ..................... H01M 4/382 429/304

FOREIGN PATENT DOCUMENTS

| CN | 114300662 | * 4/2022 |
|---|---|---|
| CN | 114865060 | * 8/2022 |
| CN | 115207483 | * 10/2022 |

* cited by examiner

*Primary Examiner* — Matthew W Van Oudenaren
(74) *Attorney, Agent, or Firm* — Maschoff Brennan

(57) ABSTRACT

Disclosed is an all-solid-state lithium battery, characterized in that an anode of the all-solid-state lithium battery comprises solid lithium metal, a solid-state electrolyte of the all-solid-state lithium battery comprises lithium lanthanum zirconium oxide, and a joint interface region between the anode and the solid-state electrolyte contains at least lithium nitride and lithium alloy.

6 Claims, 2 Drawing Sheets

ALL-SOLID-STATE LITHIUM BATTERY AND MANUFACTURING METHOD THEREOF

FIELD OF THE INVENTION

The present invention relates to an all-solid-state lithium battery and a manufacturing method thereof, and more particularly relates to an all-solid-state lithium battery which comprises solid lithium and lithium lanthanum zirconium oxide whose joint interface contains lithium nitride and lithium alloy, and a manufacturing method thereof.

BACKGROUND OF THE INVENTION

In recent years, the development of electric vehicles has become a mainstream trend in the automobile industry. The power source used by conventional electric vehicles is liquid lithium batteries. However, traditional liquid lithium batteries have low energy density and are subject to the risk of combustion and explosion in high-temperature environments.

In order to overcome the problem of low energy density and safety risks of traditional liquid lithium batteries, all-solid-state lithium batteries have been further developed at present. Although the all-solid-state lithium batteries have high energy density and no risk of combustion or explosion, they still have the problem of shorter cycle life. The cycle life refers to the total number of times that a battery can be discharged from 100% to 0% and then recharged from 0% to 100%. A shorter cycle life means the battery can be charged and discharged less times. Therefore, it is expected to provide a manufacturing method for a solid-state lithium battery that can improve the cycle life of the solid-state lithium battery.

SUMMARY OF THE INVENTION

Accordingly, one objective of the present invention is to provide a solid-state lithium battery to solve the problem of short cycle life of the solid-state lithium battery.

In order to overcome the technical problems in prior art, the present invention provides an all-solid-state lithium battery, characterized in that an anode of the all-solid-state lithium battery comprises solid lithium metal, a solid-state electrolyte of the all-solid-state lithium battery comprises lithium lanthanum zirconium oxide, and a joint interface region between the anode and the solid-state electrolyte contains at least lithium nitride and lithium alloy.

In one embodiment of the present invention, the all-solid-state lithium battery is provided, wherein the lithium alloy is lithium gallium alloy.

In one embodiment of the present invention, the all-solid-state lithium battery is provided, wherein a cathode of the all-solid-state lithium battery is lithium iron phosphate or an oxide of the lithium iron phosphate.

The present invention further provides a manufacturing method of an all-solid-state lithium battery, characterized by the following steps: a first step of mixing metal nitride and lithium metal as an anode material of an anode of the all-solid-state lithium battery and heating to form a molten lithium metal nitride alloy; a second step of placing lithium lanthanum zirconium oxide as a solid-state electrolyte material of a solid-state electrolyte of the all-solid-state lithium battery on a surface of the molten lithium metal nitride alloy to undergo an in-situ reaction; and a third step of cooling the molten lithium metal nitride alloy so that a joint interface region between the molten lithium metal nitride alloy and the lithium lanthanum zirconium oxide contains lithium nitride and lithium alloy such that the all-solid-state lithium battery contains at least lithium nitride and lithium alloy at the joint interface region between the anode and the solid-state electrolyte.

By the above method, when the molten lithium metal nitride alloy (hereinafter referred to as Li—Ga—N) and the lithium lanthanum zirconium oxide (hereinafter referred to as LLZTO) are cooled down to form a solid state, a physical state is formed in which the solid-state Li—Ga—N and the LLZTO are tightly bonded, and thus a Li—Ga—N/LLZTO material composed of a solid electrolyte layer and an anode layer is obtained, and then further combined with a cathode layer to obtain an all-solid-state lithium battery.

In one embodiment of the present invention, the manufacturing method is provided, wherein in the first step, the metal nitride is gallium nitride.

In one embodiment of the present invention, the manufacturing method is provided, wherein in the first step, the weight ratio of the metal nitride to the lithium metal is in a range between 0.01:1 to 0.03:1.

In one embodiment of the present invention, the manufacturing method is provided, wherein a heating temperature in the first step is in a range between 350 to 500° C.

In one embodiment of the present invention, the method is provided, wherein the heating temperature in the first step is in a range between 400 to 450° C.

In one embodiment of the present invention, the method is provided, wherein in the second step, the in-situ reaction takes 10 to 20 minutes.

An all-solid-state lithium battery obtained through the technical means adopted in the present invention can have a good cycle life while having high energy density and low risk.

DETAILED DESCRIPTION OF THE PREFERRED EMBODIMENTS

Figure 1:
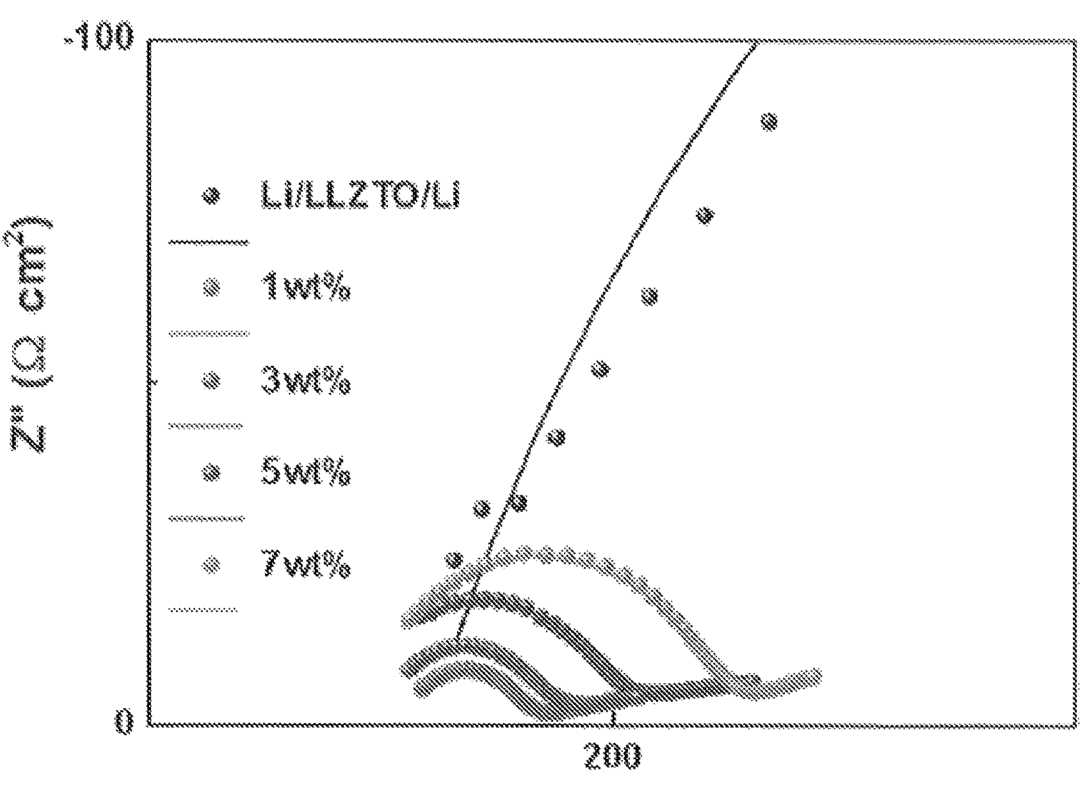
FIG. 1 is an electrochemical impedance spectroscopy spectra of an all-solid-state lithium battery according to one embodiment of the present invention.

The preferred embodiments of the present invention are described in detail below with reference to FIG. 1 to FIG. 4. The description is used for explaining the embodiments of the present invention only, but not for limiting the scope of the claims.

An all-solid-state lithium battery according to an embodiment of the present invention is characterized in that an anode of the all-solid-state lithium battery comprises solid lithium metal, a solid-state electrolyte of the all-solid-state lithium battery comprises lithium lanthanum zirconium oxide, and a joint interface region between the anode and the solid-state electrolyte contains at least lithium nitride and lithium alloy.

In the all-solid-state lithium battery according to an embodiment of the present invention, the lithium alloy is lithium gallium alloy.

In the all-solid-state lithium battery according to an embodiment of the present invention, a cathode of the all-solid-state lithium battery is lithium iron phosphate or an oxide of the lithium iron phosphate.

A manufacturing method of an all-solid-state lithium battery according to an embodiment of the present invention is characterized by the following steps: a first step of mixing metal nitride and lithium metal as an anode material of an anode of the all-solid-state lithium battery and heating to form a molten lithium metal nitride alloy; a second step of placing lithium lanthanum zirconium oxide as a solid-state electrolyte material of a solid-state electrolyte of the all-solid-state lithium battery on a surface of the molten lithium metal nitride alloy to undergo an in-situ reaction; and a third step of cooling the molten lithium metal nitride alloy so that a joint interface region between the molten lithium metal nitride alloy and the lithium lanthanum zirconium oxide contains lithium nitride and lithium alloy such that the all-solid-state lithium battery contains at least lithium nitride and lithium alloy at the joint interface region between the anode and the solid-state electrolyte.

In the manufacturing method of the all-solid-state lithium battery according to an embodiment of the present invention, in the first step, the metal nitride is gallium nitride.

In the manufacturing method of the all-solid-state lithium battery according to an embodiment of the present invention, in the first step, the weight ratio of the metal nitride to the lithium metal is in a range between 0.01:1 to 0.03:1.

In the manufacturing method of the all-solid-state lithium battery according to an embodiment of the present invention, a heating temperature in the first step is in a range between 350 to 500° C.

In the manufacturing method of the all-solid-state lithium battery according to the embodiment of the present invention, the heating temperature in the first step is more preferably in a range between 400 to 450° C.

In the manufacturing method of the all-solid-state lithium battery according to an embodiment of the present invention, in the second step, the in-situ reaction takes 10 to 20 minutes.

In the present embodiment, 0.02 g of gallium nitride and 1 g of lithium metal are weighed, i.e., the weight ratio of gallium nitride to lithium metal is 0.02:1, wherein the weight ratio of gallium nitride to lithium metal may preferably be adjusted within the range of 0.01:1 to 0.03:1, and the weight ratio of gallium nitride to lithium metal may also be adjusted arbitrarily depending on the requirements of the process. Next, the aforementioned gallium nitride and lithium metal are placed into a stainless steel plate, which is then placed into a heating chamber filled with nitrogen atmosphere and heated to 450° C. The escape of nitrogen atoms from gallium nitride can be avoided by filling the heating chamber with the nitrogen atmosphere.

The heating temperature of gallium nitride and lithium metal can be in a range between 350 to 500° C., preferably in a range between 400 to 450° C., so that the aforementioned gallium nitride and lithium metal are heated to form molten gallium nitride and molten lithium metal.

Next, the molten gallium nitride and the molten lithium metal are stirred and mixed evenly to form a molten lithium-gallium nitride alloy.

The molten lithium-gallium nitride alloy can be directly used in the subsequent all-solid-state lithium battery process, or the molten lithium-gallium nitride alloy can be cooled down to room temperature to form a solid-state lithium-gallium nitride alloy for preservation, and then heated up to 450° C. to form the molten lithium-gallium nitride alloy for subsequent use.

Next, lithium lanthanum zirconium oxide is provided, wherein in the present embodiment, LLZTO is made in the following manner: first, lithium hydroxide, lanthanum oxide, zirconium oxide and tantalum oxide are prepared, and the weight ratio (g) of the precursors is 6.00:32.99:7.27:3.73. Lithium oxide, lanthanum oxide, zirconium oxide, and tantalum oxide in lithium lanthanum zirconium tantalum oxide are provided according to atomic molar ratio of lithium:lanthanum:zirconium:tantalum=7.425:3:1.75:0.25.

Next, the aforementioned lithium hydroxide, lanthanum oxide, zirconium oxide, and tantalum oxide are placed into a ball mill (Re tsch. PM100) and meanwhile 100 ml of isopropanol with a concentration of 99.99% is added to a ball milling jar of the aforementioned ball mill, and ball milling is carried out at a speed of 300 rpm for 12 hours to evenly mix the aforementioned materials into a suspension.

Finally, the aforementioned suspension is taken out from the aforementioned ball mill and dried in an alumina crucible by heating at 70° C. for 12 hours, and then sintered at 900° C. for 12 hours, thereby making 50 g of cubic phase LLZTO with the molecular formula of $Li_{6.75}La_3Zr_{1.75}Ta_{0.25}O_{12}$.

The obtained cubic phase LLZTO is then placed in the aforementioned ball mill, and ball milling is carried out thereon at a speed of 300 rpm for 12 hours, thereby making LLZTO powder.

The aforementioned LLZTO powder is filled into an ingot mold with a diameter of 12 mm, and then the aforementioned ingot mold is subjected to a pressure of 20 t for 1 minute and then de-molded to obtain a LLZTO primary processed ingot with a diameter of 12 mm and a thickness of 3 mm.

The obtained primary processed ingot is placed in the alumina crucible. After a surface of the primary processed ingot is covered with LLZTO powder with a weight of twice the weight of the primary processed ingot, the crucible in which the primary processed ingot is placed is covered with a lid, and then the crucible is placed in another larger crucible and covered with a lid. The larger crucible is heated to 900° C., and the primary processed ingot is sintered for 4 hours in an environment of 900° C., and then further heated to 1100° C. and the primary processed ingot is sintered at 1100° C. for 12 hours to obtain LLZTO solid-state electrolyte ingot.

The aforementioned LLZTO solid-state electrolyte ingot is placed on a surface of the molten lithium-gallium oxide alloy that has been heated to a molten state to undergo an in-situ reaction for 15 minutes in an environment of 450° C.

The duration of the in-situ reaction can be in a range of 10 to 20 minutes, preferably in a range of 13 to 17 minutes.

The temperature at which the in-situ reaction is carried out, i.e., the temperature of the molten lithium-gallium nitride alloy, may be in a range of 350 to 500° C., preferably 400 to 450° C.

The in-situ reaction is carried out under the conditions described above, resulting in the formation of a joint interface between a lithium-gallium nitride alloy (hereinafter referred to as Li—Ga—N) and the LLZTO solid-state electrolyte ingot, i.e., the formation of an anode layer by the Li—Ga—N alloy on the surface of the solid-state electrolyte ingot of lanthanum zirconium tantalum oxide.

Finally, the molten Li—Ga—N alloy is cooled down to form a solid-state Li—Ga—N alloy, forming a physical state in which the solid-state Li—Ga—N and LLZTO are tightly bonded, thereby obtaining a Li—Ga—N/LLZTO material composed of a solid-state electrolyte layer and an anode layer, which is then further combined with a cathode layer to obtain an all-solid-state lithium battery.

According to the Li—Ga—N/LLZTO material of the present embodiment, the surface of the Li—Ga—N/LLZTO materials are $Li_3N$ and Li—Ga alloys produced after the thermal decomposition of molten Li and GaN, both of them can maintain the interface stability between Li—Ga—N and LLZTO, and have the effect of inhibiting the formation of lithium metal dendrites (i.e., lithium dendritic precipitation) so that it can reduce the risk of low safety, short cycle life, or even malfunctioning, which may result from the dendrites formation in lithium batteries.

[Electrochemical Impedance Spectroscopy Analysis of all-Solid-State Lithium Batteries]

First, while an existing lithium/lithium lanthanum zirconium tantalum oxide/lithium all-solid-state symmetric (i.e., both the cathode and the anode contain lithium metal) lithium battery (hereinafter referred to as a Li/LLZTO/Li battery) is prepared, the Li—Ga—N/LLZTO material of the present embodiment is used to prepare lithium-gallium nitride/lithium lanthanum zirconium tantalum oxide/lithium-gallium nitride all-solid-state symmetric (i.e., both the cathode and the anode contain lithium-gallium nitride material) lithium batteries with different lithium-gallium nitride doping ratios (hereinafter referred to as Li—Ga—N/LLZTO/Li—Ga—N batteries), wherein the Li/LLZTO/Li battery is used as the control group for the present analysis, and a Li—Ga—N/LLZTO/Li—Ga—N battery with 1 wt % lithium-gallium nitride is used as the experimental group 1 for the present analysis, a Li—Ga—N/LLZTO/Li—Ga—N battery with 3 wt % lithium-gallium nitride is used as the experimental group 2 for the present analysis, a Li—Ga—N/LLZTO/Li—Ga—N battery with 5 wt % lithium-gallium nitride is used as the experimental group 3 for the present analysis, and a Li—Ga—N/LLZTO/Li—Ga—N battery with 7 wt % lithium-gallium nitride is used as the experimental group 4 for the present analysis.

Next, an electrochemical impedance spectroscopy (EIS) analyzer PGSTAT30 (manufactured by Autolab) is used, and an AC impedance test is conducted by connecting the cathode and anode of the EIS analyzer to the cathode and anode of the batteries of the control group and the experimental groups 1 to 4, respectively, with the AC frequency range of the EIS analyzer set to 1 M to 0.1 Hz, i.e., the analysis frequency is set to 1 M to 0.1 Hz, so as to analyze the electrochemical impedance spectra of the control group and the experimental groups 1 to 3, and the interface impedance analysis results are shown in FIG. 1 and Table 1.

TABLE 1

| | Control group | Experimental group 1 | Experimental group 2 | Experimental group 3 | Experimental group 4 |
|---|---|---|---|---|---|
| Interface impedance (ohm $cm^2$) | 589 | 21 | 31 | 47 | 78 |

As shown in FIG. 1 and Table 1, the experimental group 1 has the lowest interface impedance of 21 (ohm $cm^2$), while the interface impedance of the control group is 589 (ohm $cm^2$), which means that the interface impedance of the experimental group 1 is 1/28 of that of the control group. As for the experimental groups 2 to 4, the interface impedance is much lower than that of the traditional solid-state battery, so it is proved that different ratios of gallium nitride still have the effect of reducing the impedance.

The higher the interface impedance of a solid-state battery, the more difficult it is to make full contact between the solid-state electrolyte and the electrode interface, which will increase the energy loss of the solid-state battery during charging and discharging and make it difficult to achieve rapid charging and discharging of the solid-state battery. Based on the above tests, it can be seen that the all-solid-state lithium battery according to the embodiment has better energy transmission efficiency and can achieve rapid charging and discharging compared with the traditional all-solid-state lithium battery.

[Voltage Trend Test of the all-Solid-State Lithium Battery]

In this test, the voltage trend of the aforementioned Li—Ga—N/LLZTO/Li—Ga—N battery is tested with a positive and negative constant current of 0.1 mA/$cm^2$ after using a charge-discharge tester BAT-750B (manufactured by AcuTech) to connect the cathode and anode of the solid-state battery, a cycle of the positive and negative constant current cycles is set to 1 hour and the constant current cycle is performed continuously for 1000 hours to detect the voltage trend of the Li—Ga—N/LLZTO/Li—Ga—N battery during this time period. The results of this test are shown in FIG. 2.

Figure 2:
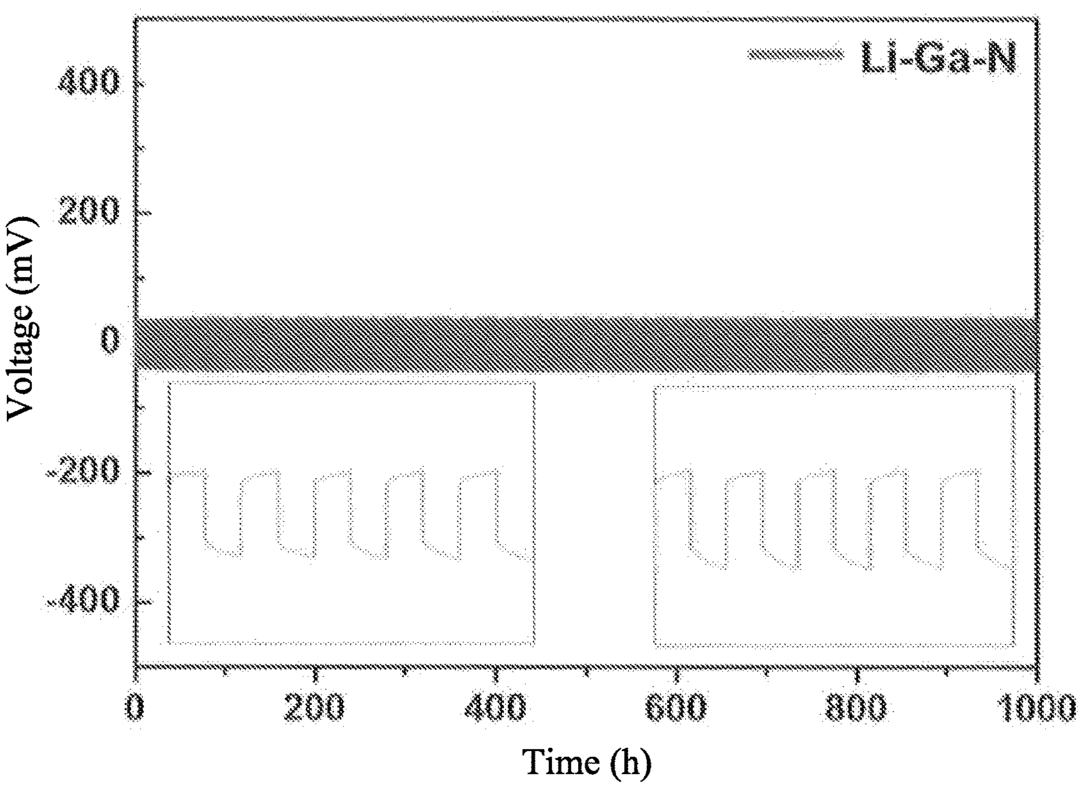
FIG. 2 is a schematic diagram illustrating the voltage trend of the all-solid-state lithium battery according to one embodiment of the present invention.

As shown in FIG. 2, the voltage of the Li—Ga—N/LLZTO/Li—Ga—N battery is maintained essentially within a fixed range during the 1000 hours of conducting the test. From the above results, it can be seen that after 1000 hours of constant current cycle, the Li—Ga—N/LLZTO/Li—Ga—N battery can still keep the voltage stable without short-circuiting.

[Charging-Discharging Cycle Test of the all-Solid-State Lithium Battery]

In this test, a Li—Ga—N/LLZTO/LFP battery is made by assembling the Li—Ga—N/LLZTO material according to the embodiment and a lithium iron phosphate (LFP) cathode. The Li—Ga—N/LLZTO/LFP battery is connected to the charging-discharging tester BAT-750B (manufactured by AcuTech) and, the charging-discharging cycle is performed at a rate of 0.1 C in a room-temperature environment. The results of this test are shown in FIG. 3 and FIG. 4.

Figure 3:
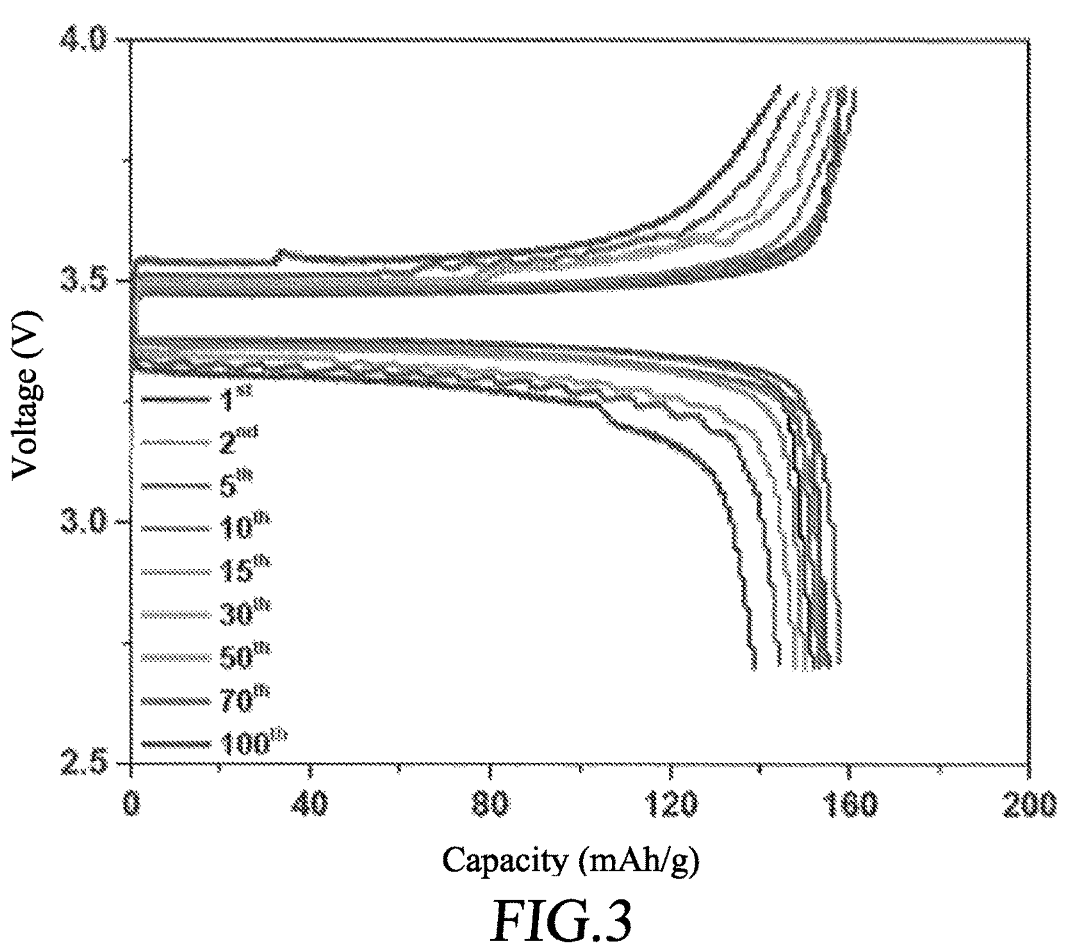
FIG. 3 is a secondary ion mass spectra of the all-solid-state lithium battery according to one embodiment of the present invention.
Figure 4:
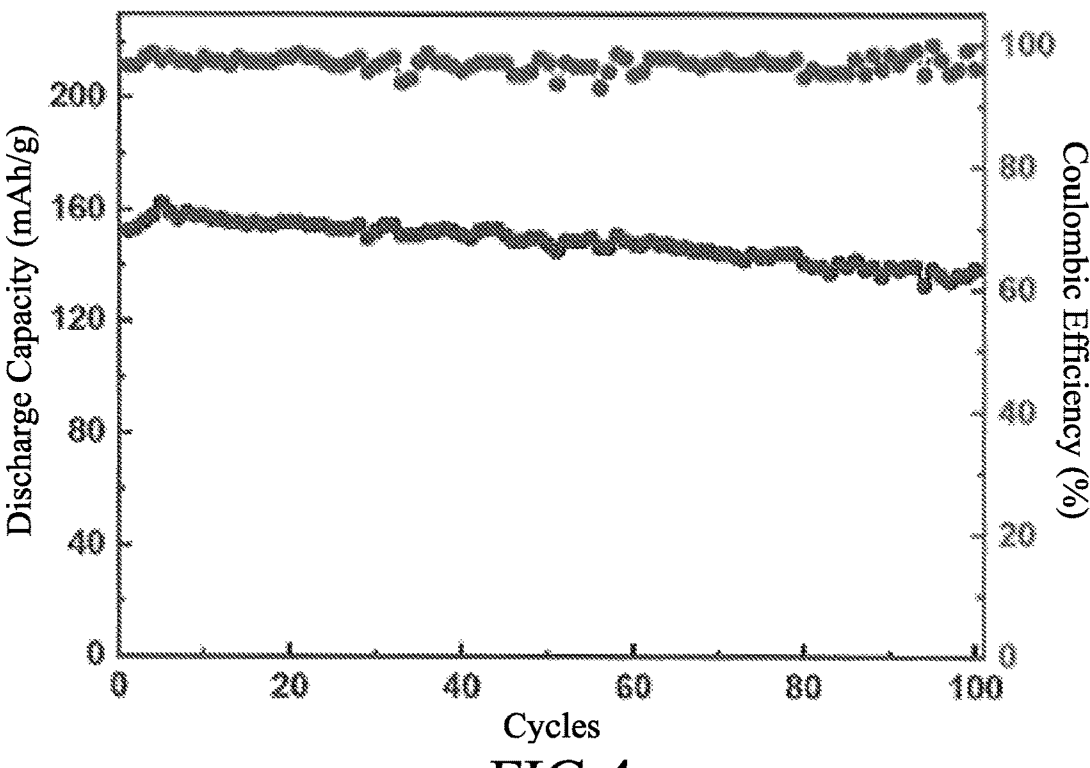
FIG. 4 is a schematic diagram illustrating an electrochemical cycle of the all-solid-state lithium battery according to one embodiment of the present invention.

As shown in FIG. 3 and FIG. 4, when the Li—Ga—N/LLZTO/LFP battery undergoes the first cycle of the charging-discharging cycle test, its discharge capacity reaches 150 mAh/g (FIG. 3), and the Coulombic efficiency, i.e., the percentage of battery discharge capacity and charge capacity, reaches 96.8% (FIG. 4), after 100 cycles of charging and discharging, the Li—Ga—N/LLZTO/LFP battery has a discharge capacity of 139 mAh/g (FIG. 4) and the Coulombic efficiency of 91.4% (FIG. 4). From the above test, it can be seen that after 100 cycles of charging and discharging, the discharge capacity and Coulombic efficiency of the all-solid-state lithium battery according to the embodiment can still be maintained close to the discharge capacity and Coulombic efficiency of the initial charging and discharging.

As mentioned above, according to the all-solid-state lithium battery of the present invention, the interface stability can be improved through a close contact interface between the Li—Ga—N as the anode and the LLZTO as the solid-state electrolyte, thereby improving the cycle life of the all-solid-state lithium battery. At the same time, it can be seen from the above analysis and tests that the all-solid-state lithium battery material according to the present invention has low interface impedance, has better energy transmission efficiency, and can achieve rapid charging and discharging compared with the traditional all-solid-state lithium battery.

Furthermore, the all-solid-state lithium battery according to the present invention can still keep the voltage stable without short-circuiting after 1000 hours of constant current cycle. The all-solid-state lithium battery according to the present invention has $Li_3N$ and Li—Ga alloys, both of them can maintain the interface stability between Li—Ga—N and LLZTO, and have the effect of inhibiting the formation of lithium metal dendrites. In addition, after 100 cycles of charging and discharging, the discharge capacity and Coulombic efficiency of the all-solid-state lithium battery according to the present invention can still be maintained close to the discharge capacity and Coulombic efficiency of the initial charging and discharging.

The above description is only an explanation of the preferred embodiments of the present invention. One having ordinary skill in the art can make various modifications according to the above description and the claims defined below. However, those modifications shall still fall within the scope of the present invention.

What is claimed is:

1. A manufacturing method of an all-solid-state lithium battery, characterized by the following steps:

a first step of mixing metal nitride and lithium metal as an anode material of an anode of the all-solid-state lithium battery and heating to form a molten lithium metal nitride alloy;

a second step of placing lithium lanthanum zirconium oxide as a solid-state electrolyte material of a solid-state electrolyte of the all-solid-state lithium battery on a surface of the molten lithium metal nitride alloy to undergo an in-situ reaction; and a third step of cooling the molten lithium metal nitride alloy so that a joint interface region between the molten lithium metal nitride alloy and the lithium lanthanum zirconium oxide contains lithium nitride and lithium alloy such that the all-solid-state lithium battery contains at least lithium nitride and lithium alloy at the joint interface region between the anode and the solid-state electrolyte.

2. The manufacturing method as claimed in claim 1, wherein in the first step, the metal nitride is gallium nitride.

3. The manufacturing method as claimed in claim 1, wherein in the first step, a weight ratio of the metal nitride to the lithium metal is in a range between 0.01:1 to 0.03:1.

4. The manufacturing method as claimed in claim 1, wherein a heating temperature in the first step is in a range between 350 to 500° C.

5. The manufacturing method as claimed in claim 4, wherein the heating temperature in the first step is in a range between 400 to 450° C.

6. The manufacturing method as claimed in claim 1, wherein the second step takes 10 to 20 minutes.

* * * * *